United States Patent [19]

Dobrowski et al.

[11] Patent Number: 4,971,268
[45] Date of Patent: Nov. 20, 1990

[54] DIELECTRIC SUPPORT AND WEAR SLEEVE

[75] Inventors: Robert S. Dobrowski, Maple Valley; Jerome C. Rosenberg, Bellevue, both of Wash.

[73] Assignee: The Boeing Company, Seattle, Wash.

[21] Appl. No.: 276,205

[22] Filed: Nov. 23, 1988

[51] Int. Cl.$^5$ .............................................. B64D 37/32
[52] U.S. Cl. ................................................. 244/135 R
[58] Field of Search ............ 244/135 R, 1 R; 248/55, 248/56, 74.1; 361/215, 216, 218; 285/47, 53, 62

[56] References Cited

U.S. PATENT DOCUMENTS

| | | | |
|---|---|---|---|
| 1,079,758 | 11/1913 | Gray | 248/55 |
| 2,451,699 | 10/1948 | Twaroski . | |
| 3,061,253 | 10/1962 | Keaton | 248/74.1 |
| 3,857,588 | 12/1974 | Curtin . | |
| 4,006,874 | 2/1977 | McGee . | |
| 4,103,943 | 8/1978 | Curtin . | |
| 4,109,944 | 8/1978 | Curtin . | |
| 4,382,570 | 5/1983 | Craig . | |
| 4,393,998 | 7/1983 | Allen et al. | 248/74.1 |
| 4,429,907 | 2/1984 | Timmons . | |
| 4,478,381 | 10/1984 | Pittion et al. | 248/74.1 |
| 4,530,478 | 7/1985 | McClellan . | |
| 4,630,789 | 12/1986 | Rosenberg . | |
| 4,654,747 | 3/1987 | Covey . | |

FOREIGN PATENT DOCUMENTS 1189641  4/1970  United Kingdom .................. 248/55

Primary Examiner—Joseph F. Peters, Jr.
Assistant Examiner—Anne Sartelle
Attorney, Agent, or Firm—Seed and Berry

[57] ABSTRACT

A tubing inside an aircraft fuel tank is encircled by a dielectric support and wear sleeve that is comprised of two members that are clamped together circumferentially around the tubing. The members include projecting portions having an adhesive applied thereto along mating surfaces to rigidly couple the support sleeve members to each other. The mating surface is a circumferential arc that provides complete overlap of a portion of the two support sleeve members. The adhesive extends circumferentially along the mating surface to provide sufficient dielectric strength due to the extended length of the adhesive coupling. The tubing and sleeve are supported by a support assembly including a clamp, bracket and tank wall. The sleeve material has the necessary thickness and length to provide dielectric isolation of the tube from the support assembly. The sleeve is designed having tight tolerances along the outside diameter to permit axial motion with respect to the clamp while restraining radial motion. The sleeve may be easily removed and replaced without disturbing the tubing or other aircraft structure if desired.

16 Claims, 3 Drawing Sheets

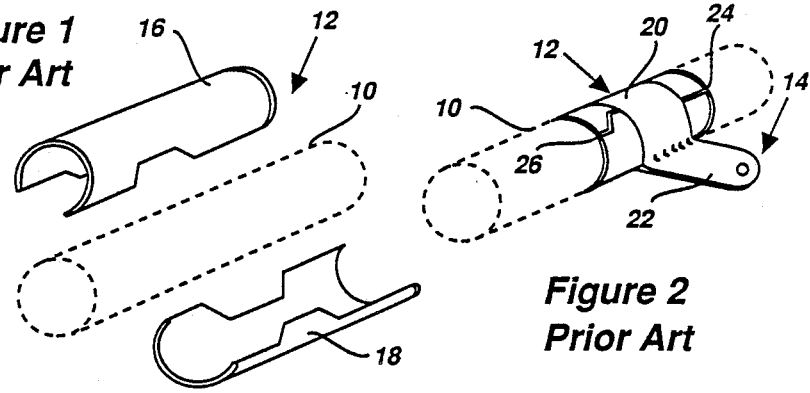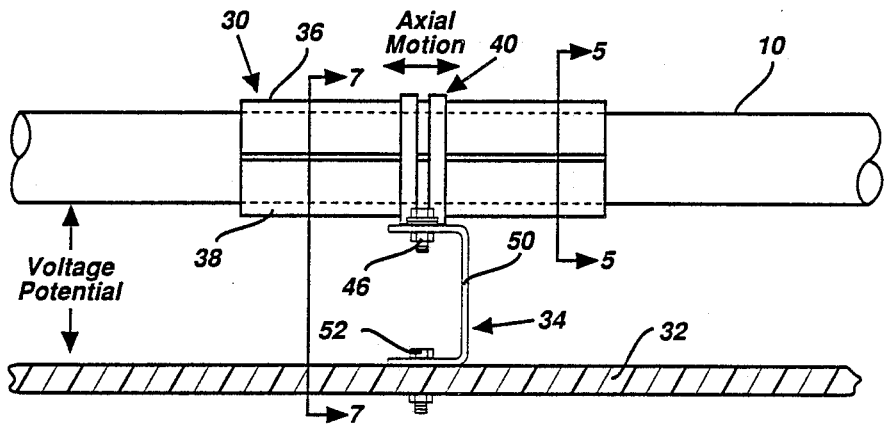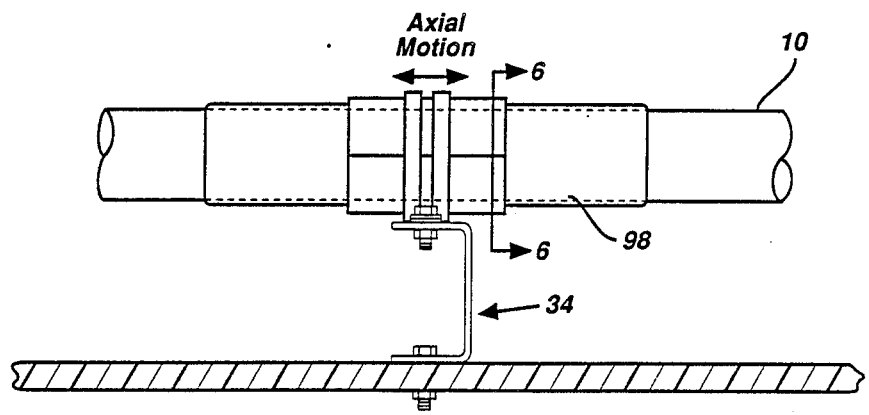

DIELECTRIC SUPPORT AND WEAR SLEEVE

STATEMENT OF GOVERNMENT RIGHTS

The United States government has rights in this invention.

TECHNICAL FIELD

This invention relates to a support for tubing within aircraft fuel tanks, and more particularly, to a dielectric support and wear sleeve positioned between the tubing and a clamp to prevent electrical arcing within the fuel tank.

BACKGROUND OF THE INVENTION

Fuel tanks in aircraft are commonly located within the wing structure. Many tubings, for example, hydraulic fluid conduit and fuel supply lines, extend through the fuel tank. The tubing must be supported within the fuel tank. Generally, a support bracket and clamp extend from the fuel tank wall to support the tubing.

During flight, the aircraft wings experience significant vertical displacement. The aircraft structure also experiences high vibration levels, temperature variations, aerodynamic buffeting and structural flexure. Frequently, the tubing is displaced relative to the tank wall supporting the tubing. When there is movement of the fuel tank wall relative to the tubing, the tubing must be permitted to move with respect to the wall to prevent breaking the wall, the tubing or both. In present aircraft, a wear sleeve extends around the tubing, a clamp extends around the wear sleeve, and the clamp is coupled to the fuel tank wall. The clamp is loosely coupled around the wear sleeve so that when the tubing moves relative to the tank wall, the wear sleeve moves axially within the clamp.

Because the tubing is within the fuel tank, the tubing is surrounded by liquid fuel or fuel vapors. If electrical arcing within a fuel tank occurs, particularly in the vapor, a destructive explosion is possible. It is important to minimize or prevent electrical arcing within the fuel tank to ensure that such an explosion does not occur. In older aircraft, because both the tank wall and tubing were metal, electrical arcing could be avoided by grounding them together. In recently designed aircraft, because the tubing is metal and the tank is not metal, electrical arcing between the tubing and the fuel tank wall can occur, even though the fuel tank and tubing are grounded together.

U.S. Pat. No. 4,630,789, to Rosenberg, incorporated herein by reference, teaches that arcing between metal tubing and adjacent structure may be eliminated by coating the tubing with a dielectric insulator along its entire length of interest. While such a dielectric coating is useful to prevent electrical arcing, no provision is made for supporting the tubing within a fuel tank and permitting relative motion between the support assembly and the tubing.

Insulating the tubing from the support clamp using heat-shrink tubing placed over the conduit has been described in U.S. Pat. No. 4,654,747, to Covey, incorporated herein by reference. The heat-shrink tubing acts as the wear sleeve and also provides dielectric insulation between the fuel tank, clamp and tubing. One disadvantage of using heat-shrink tubing is the difficulty in installing or removing the tubing. The heat-shrink tubing must be inserted over the end of the metal tubing, moved to the proper position and then heated. If the insulating layer cracks or otherwise degrades, the metal tubing must be cut out of the aircraft wing and replaced in order to remove and reinstall heat-shrink tubing. This is very expensive and time-consuming.

A further disadvantage of using heat-shrink tubing is that the preferred physical properties required of a wear sleeve are difficult to provide in the material used for heat-shrink tubing. The clamp must be a relatively snug fit around the wear sleeve to prevent radial movement of the tubing but be sufficiently loose to permit axial movement. If the wear sleeve is too small, the tubing will bounce within the clamp causing damage; if it is too large, then the clamp does not fit loosely enough to permit movement of the tubing, and the tubing or tank wall may be broken. Ideally, the inside diameter of the clamp around the wear sleeve is a predetermined constant value and the outside diameter of the wear sleeve is a predetermined constant value. Controlling the outside diameter of heat-shrink tubing is extremely difficult as it depends upon the amount of heat applied, the time of the heat applied and many other factors. Frequently, the outside diameter of a single heat-shrink wear sleeve may vary along the axial length, causing the clamp to stick at some locations. The outside diameter of the heat shrink tubing will also vary from wear sleeve to wear sleeve.

SUMMARY OF THE INVENTION

It is therefore an object of this invention to prevent electrical arcing between the tubing and the fuel tank while permitting axial motion of the tubing.

It is another object of the invention to permit ease in installation, removal and replacement of the wear sleeve.

It is another object of this invention to provide a wear sleeve having an exact outside diameter along sufficient axial length to permit a clamp to restrain radial motion while permitting axial motion.

These and other objects of the invention as described herein, are accomplished by providing a dielectric support and wear sleeve comprised of two rigid members. The two members are coupled to each other and to the tubing to form a dielectric support and wear sleeve. A clamp extends around the sleeve and is rigidly coupled to the tank wall. The clamp has an inside diameter matched to the sleeve's outside diameter to permit axial displacement of the tubing with respect to the clamp but restrain radial motion. The sleeve has a fixed outside diameter within tight tolerances and a high dielectric strength. The adhesive which bonds the sleeve members to each other has a dielectric strength sufficiently high to prevent electrical arcing between the tubing and the clamp assembly through the adhesive. The members are coupled together along overlapping projections to ensure that the adhesive has sufficient dielectric strength and that no gaps exist in the sleeve through which arcing may occur. The dielectric wear sleeve extending sufficiently long laterally along the tubing to prevent electrical arcing between the tubing and the clamp assembly.

In an alternative embodiment, a dielectric coating completely surrounds the tubing in the region adjacent the clamp. The dielectric coating has an axial length sufficiently long to prevent electrical arcing between the tubing and the clamp. A wear sleeve extending around the dielectric coating has sufficient axial length to permit the maximum expected motion of the tubing relative to the clamp, but is shorter than the length required to prevent arcing. The dielectric coating may be used when the tubing curves or some structural design prevents use of a longer wear sleeve.

BRIEF DESCRIPTION OF THE DRAWINGS

FIG. 1 is an isometric view of a prior art wear sleeve.

FIG. 2 is an isometric view of a prior art wear sleeve and support assembly.

FIG. 3 is a side elevational view of a dielectric support and wear sleeve and support assembly according to the invention.

FIG. 4 is a side elevational view of a dielectric support and wear sleeve and support assembly according to an alternative embodiment of the invention.

DETAILED DESCRIPTION OF THE INVENTION

Figure 5:
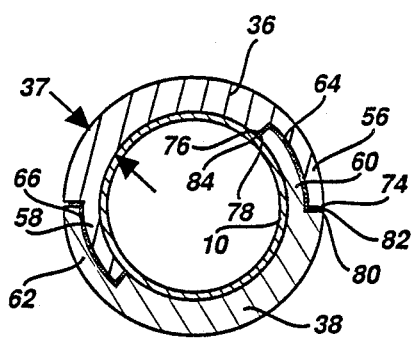
FIG. 5 is a cross-sectional view taken along lines 5—5 of FIG. 3.

In the prior art, a tubing 10 is supported within an aircraft fuel tank using the wear sleeve 12 and support assembly 14, as illustrated in FIGS. 1 and 2, labeled "Prior Art." The sleeve 12 includes a first member 16 and a second member 18 which are coupled together around the tubing 10 to form the sleeve 12. The support assembly 14 includes a clamp portion 20 and a bracket portion 22 for coupling the tubing 10 to the aircraft tank wall. Axial movement of the sleeve 12 relative to the support assembly 14 is permitted while radial movement is restrained. A sleeve and support assembly of this type is shown and described in U.S. Pat. No. 4,006,874, to McGee, incorporated herein by reference.

The prior art sleeve and support assembly are suitable for use when all structures adjacent the tubing, including the fuel tank, are metallic. In the prior art with metallic fuel tanks, the tubing, wear sleeve, clamp, fuel tank, and other structures are grounded together to ensure that electrical arcing between adjacent structures within the fuel tank does not occur. However, fuel tanks are now being constructed of a nonmetallic material having a conductivity significantly different than metal, such as a graphite-epoxy composite material. An electric charge may build up on different parts of the aircraft structure at different rates, for example, due to a lightning strike or static charge build-up, causing the fuel tank wall, support assembly and tubing to be at different electrical potentials. Arcing between the different structures because of the difference in voltage potential may ignite fuel in the tank, resulting in a destructive explosion. The prior art sleeve 12 does not electrically insulate the tubing 10 from the support assembly 14. For example, the sleeve 12 may be constructed of a material providing a good wear surface but having a low dielectric strength. Even if the sleeve 12 is made of an insulating material, the gaps 24 and 26, as shown in FIG. 2, between the two members of the sleeve 12, permit electrical arcing directly from the tubing 10 to the support assembly 14.

A support assembly 34 and a dielectric support and wear sleeve 30 coupled around tubing 10 according to the invention are illustrated in FIGS. 3–7. The support assembly 34 includes a clamp, 40, fasteners 46 and 48, bracket 50 and wall support member 32. The tubing 10 is metallic, as is commonly used for hydraulic fluids or fuel supply. The wall support member 32 is nonmetallic, having electrical conduction properties significantly different than metallic tubing 10.

The tubing 10 and support assembly 34 are often at a different voltage potentials. The tubing 10 has a very good conductivity along its entire length. If the member 32 is a graphite-epoxy composite, the outer layer generally acts as an insulator, however, the inner graphite fibers are partially conductive. Electrical charge, due to a lightning strike, static charge or the like, may be locally present on the surface of member 32 and not present on the tubing or vice versa. Because the tubing 10, extends to the wing tips and throughout different sections of the aircraft, it may be at a significantly different voltage potential than the local voltage potential of the support assembly 34. Thus, arcing, due to the difference in voltage potential, must be eliminated between the tubing 10 and support assembly 34 by the dielectric support and wear sleeve 30.

The dielectric support and wear sleeve 30 includes a first sleeve member 36 and a second sleeve member 38, as can be seen in FIG. 5. Sleeve member 36 includes projecting portions 56 and 58 to aid in coupling with sleeve member 38. Sleeve member 38 includes projecting portions 60 and 62 to couple with projecting portions 56 and 58, respectively. Preferably, sleeve members 36 and 38 are identical to each other and interchangeable. An adhesive layer 64 between projecting portion 56 and projecting portion 60, and adhesive layer 66 between projecting portions 58 and 62, rigidly couple sleeve member 36 to sleeve member 38. The sleeve 30 is sufficiently long to prevent arcing between the tubing 10 and the closest portion of the support assembly 34, for example, the bracket 50, the fasteners or the clamp 40. The sleeve 30 must also have sufficient dielectric strength to prevent arcing through the sleeve between the tubing 10 and the adjacent clamp 40.

The sleeve members 36 and 38 are coupled together along circumferentially overlapping projections that extend along the length of the wear sleeve. Having circumferential mating surfaces ensures that the sleeve 30 provides complete dielectric isolation between the tubing 10 and the support assembly 34. Sleeve members 36 and 38 have a dielectric strength sufficiently high at their thinnest portions, generally the projections, to prevent electrical arcing between the tubing and any immediately adjacent structure for the highest voltage potential difference that is expected.

The adhesive layers 64 and 66 have a dielectric strength sufficient to prevent arcing. The dielectric constant, that is a dielectric strength per unit length of the adhesive layers 64 and 66 may be less than the dielectric constant of sleeve members 36 and 38. However, because of the circumferential mating surface, the adhesive layers 64 and 66 have a significantly longer path from the tubing 10 to an outside structure, therefore, the full dielectric strength of the adhesive 64 and 66 is very high and is sufficiently high to prevent electrical arcing. For example, as can be seen from FIG. 5, the adhesive layer 64 extends circumferentially between the projections 56 and 60 along a mating face thereof. The projections 56 and 60 are significantly circumferentially longer than the radial width 37 of the dielectric members, up to two or three times longer The size and shape of the projection portions 56, 58, 60 and 62 are determined based on the external diameter of the tubing and the dielectric properties of the adhesive. The projecting portions 56 and 60 are made sufficiently long circumferentially to ensure that, based on the dielectric properties of the selected adhesive, sufficient insulation between the tubing 10 and an immediately adjacent portions of support assembly 34 is provided. If the adhesive has a dielectric constant equal to or greater than the sleeve, the projections may be equal in length to the radial width and still provide the desired protection. Conversely, if the adhesive's dielectric constant is low, the projections must be made much longer, be grooved or the like to provide the necessary path length for sufficient insulation.

The projecting portion 56 includes an end region 74 and a shoulder region 76, as can be seen viewing FIG. 5. Similarly, projecting portion 60 of member 38 includes a end 78 and a shoulder 80. The projecting portions have sufficient length to ensure that the support sleeve members contact the tubing pror to the ends 74 and 78 contacting the corresponding shoulder regions 80 and 76. Space 82 is left between the end 74 of projecting portion 56 and the shoulder 80 of sleeve member 38. A similar space remains between projecting portion ends and shoulders of portions 58 and 62. The space 82 provides an overflow gap in which the adhesive 64 may flow while the sleeve members are being coupled together. The space 82 may be partially or completely filled with adhesive. Preferably, the adhesive does not extend out of space 82 to the outside surface of the wear sleeve because it would prevent a correct fit between the clamp 40 and the sleeve 30. If adhesive is on the outside surface of sleeve 30, it must be removed prior to placing the clamp around the sleeve. Space 82 also provides additional advantages. For example, the thermal coefficient of expansion of the adhesive 60 may be somewhat different than the tubing 10 or the sleeve 30. The spaces 82 and 84 permit the differences between the coefficient of thermal expansion of the materials to fill the space without varying the outside diameter of the sleeve 30 and the relationship of the sleeve 30 with respect to the clamp 40. Repeated thermal expansions and contractions which may cause premature degrading are prevented or allowed for.

Figure 7:
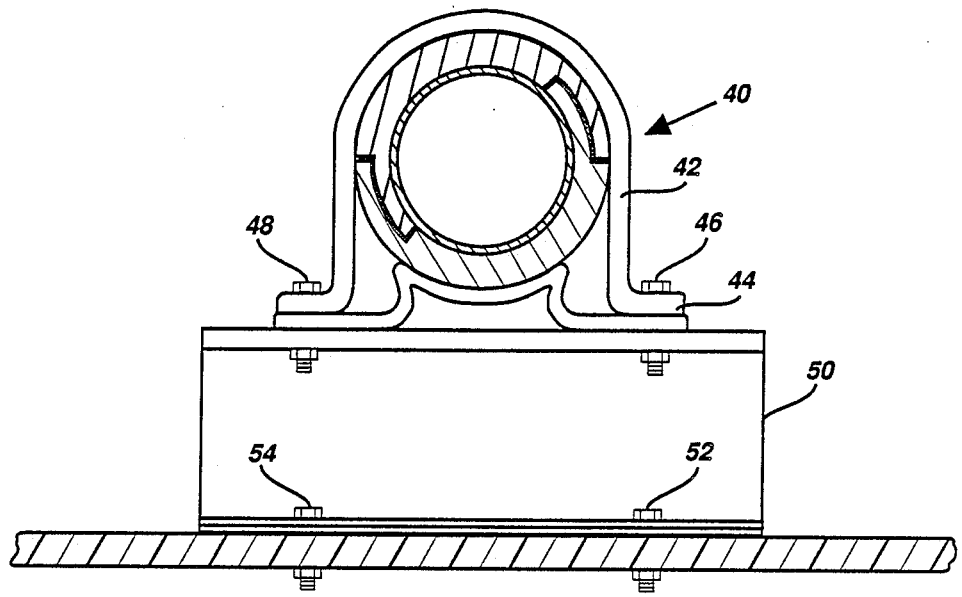
FIG. 7 is a cross sectional view taken along lines 7—7 of FIG. 3.

The clamp 40 closely encircles the sleeve 30 to permit axial motion of the sleeve with respect to the clamp while preventing radial motion, as can be seen from FIG. 7. The clamp 40 includes a first clamp member 42 and a second clamp 44 coupled together by fasteners 46 and 48. Bracket 50 is coupled to clamp 40 by fasteners 46 and 48 and to the support member 32 by fasteners 52 and 54, as shown in FIG. 7. The bracket 50 is made sufficiently large to maintain the tubing 10 the proper distance from the member 32 to prevent electrical arcing between the tubing 10 and the member 32. The inside surface of the clamp assembly 40 may be coated with Teflon TM or some other antifriction material to permit smooth axial motion of the sleeve 30 within the clamp 40. The clamp 40 circumferentially contacts the wear sleeve 30 to prevent radial motion. The outside diameter of the sleeve 30 and the inside diameter of the clamp 40 must be constructed within tight tolerances to ensure that radial motion is restrained while permitting sliding axial motion. The wear sleeve members 36 and 38 are preferably constructed of a durable dielectric material such as a plastic, for example, polyamid-imide, nylon, or other suitabe material. The sleeve 30 is thick-walled and may be machine or injection molded to the required precision inside and outside diameter.

Figure 8:
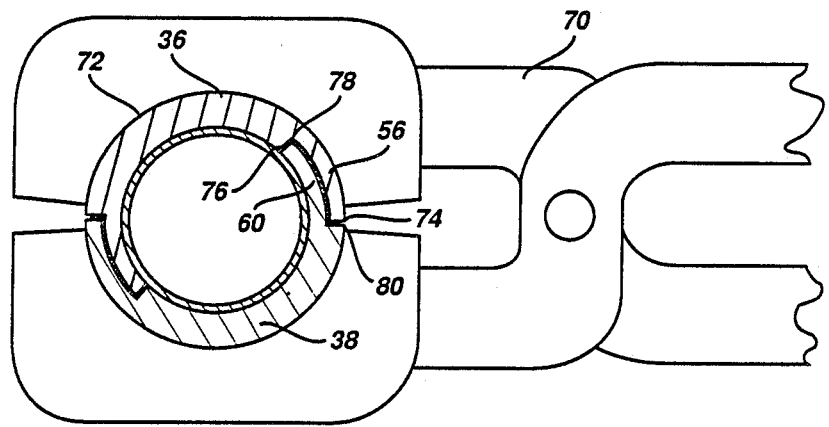
FIG. 8 is a partial cross-sectional view of a clamping tool for attaching the sleeve according to the present invention.

Sleeve members 36 and 38 may be coupled together using the clamping tool 70, as illustrated in FIG. 8. The clamping surface 72 of the clamping tool 70 has an exact inside diameter to ensure that the outside diameter of the sleeve 30 is exact.

The method of coupling the sleeve 30 to the tubing and support member 32 is as follows. Adhesive is applied to one or both of the mating surfaces of projecting portions between 56 and 60 and between 58 and 62. Adhesive may also be applied to the outside surface of tubing 10 if desired, but is not necessary. The sleeve member 36 and sleeve member 38 are positioned circumferentially around the tubing 10 and pressed together to create firm contact between the mating faces of the projecting portions of the respective members. Clamping tool 70 having an interior clamping surface 72 is placed around the two members. Force is applied pulling the clamping surface 72 together to an exact outside diameter. The clamping tool 70 is held in position until the adhesive is sufficiently set to prevent movement of the members 36 and 38 with respect to each other. Clamp members 42 and 44 are placed around the sleeve 30 to form clamp 40 encircling the sleeve. The clamp members are coupled together and to bracket 50.

In the event the sleeve 30 becomes damaged, repair is easily accomplished. The existing sleeve 30 and damaged parts are cut off of the tubing 10. The tubing 10 is left in place within the aircraft structure and new sleeve members 36 and 38 are coupled to each other, encircling the tubing 10 following the same technique as originally used in applying the sleeve 30 to the tubing 10. The new sleeve may be coupled around the tubing without disturbing the tubing or adjacent structures. The two-piece sleeve and clamp structure provides significant ease in initial application and later repair of the wear sleeve than provided by the prior art heat-shrink tubing.

Figure 6:
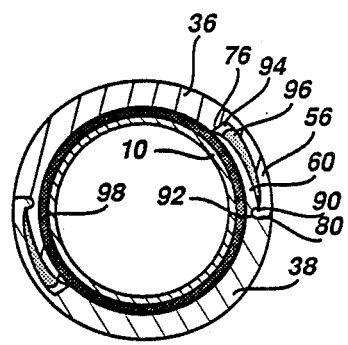
FIG. 6 is a cross-sectional view taken along lines 6—6 of FIG. 4.

The members 36 and 38 may be coupled together using a tongue and groove arrangement, as shown in the alternative embodiment of FIG. 6. In the alternative embodiment, projecting portion 56 of sleeve member 36 includes a tongue portion 90 and the projecting portion 60 of the member 38 may include a corresponding mating groove 92. The respective tongue and groove are precisely located during the machining or molding of the respective parts to ensure that the sleeve 30 will have an exactly known outside diameter when the tongue 90 engages the groove 92 to rigidly hold the sleeve members 36 and 38 together. Using the tongue and groove coupling permits the sleeve members to be rigidly attached to each other having a known outside diameter without the necessity of using clamping tool 70. Projecting portion 60 has a circumferentially tapered face, as shown, to permit the tongue 90 to more easily engage the face and slide there along until engaging within groove 92. Alternatively, the projecting portion 60 may be untapered.

The space between the end of projecting portion 56 and shoulder 26 can be eliminated using the tongue and groove assembly by precisely locating the tongue and mating groove, to further increase the dielectric strength of the sleeve 30. A space 94 between projecting members 56 and 60 is provided because of the tapering of projecting member 60. An adhesive 96 may be placed between the mating faces of projecting members 56 and 60 if desired. The space 94 is sufficiently large to permit excess adhesive to partially fill the space. A space between the projecting portion 60 and shoulder 76 to permit the adhesive to contact and fow around the tubing 10 may be provided if desired. While the tongue and groove coupling has been shown in combination with the dielectric coating 98, it may be used in the embodiment of FIG. 3. Further, the tongue and groove may be located to provide a space between the projecting portion 56 and shoulder 80 if desired.

In the embodiment of FIG. 3, the sleeve 30 is sufficient long laterally along the tubing 10 to prevent arcing between the tubing 10 and any portion of support assembly 34. A sleeve 30 of 8 inches long and having a radial width of 1/16 inch has been found sufficient to prevent arcing due to lightning strikes, static charges and the like. In the embodiment of FIG. 4, the sleeve 30 is sufficiently long to permit the necessary axial motion of the tubing 10 with respect to the clamp 40, but is not sufficiently long to prevent electrical arching between the tubing 10 and the support assembly 34. Some design features of the aircraft, such as a curve in the tubing 10, closely adjacent structure, or the like, may prevent the wear sleeve 30 from being sufficiently long to prevent arcing. To provide adequate dielectric insulation between the tubing 10 and the support assembly 34 a dielectric coating 98, having a very high dielectric constant, may be applied around the tubing 10 prior to attaching the sleeve 30. The dielectric coating 98 is sufficiently long to prevent electrical arcing between the tubing 10 and the next adjacent structure, such as support assembly 34. Generally, the distance required for dielectric isolation will be significantly larger than the axial motion of the tubing 10 with respect to the support assembly 34. While the dielectric coating 98 around the tubing 10 is illustrated used in combination with the tongue and groove sleeve embodiment of FIG. 6; it may be used in combination with the sleeve 30 of FIG. 5 or not used at all, depending upon the location of the tubing and other design features.

The dielectric layer 98 provides additional insulation in the region immediately adjacent the support assembly 34 in addition to that provided by the wear sleeve 30, as shown in FIG. 4. The sleeve 30 may be made somewhat thinner if dielectric layer 98 is present. The sleeve 30 has an interior diameter corresponding to the outside diameter of the tubing 10 with the dielectric coating 98 applied thereto to ensure a rigid and accurate fit between the interior of the sleeve 30 and the tubing 10. Used in combination with the dielectric coating 98, the outside diameter of the sleeve 30 is precisely formed, either by tool 70 or tongue and groove coupling to be just less than the inside diameter of the clamp 40 as explained herein.

The invention has been described and illustrated in preferred embodiments. As will be apparent to those of ordinary skill in the art, equivalent structures exist which operate in the same way to provide the dielectric insulation in combination with the sleeve and tube support structure than those specifically described and illustrated herein. Equivalent structures fall within the scope of the invention.

We claim:

1. A support assembly for supporting a tubing within a fuel tank, comprising:
   a dielectric support and wear sleeve adapted to be coupled to said tubing, said sleeve including a first member and a second member, each of said members having a fixed outside radius and a fixed inside radius, said first and second members coupled to each other along circumferentially mating surfaces to provide a wear sleeve having a predetermined minimum dielectric strength for axial length sufficient to prevent arcing between said support assembly and said tubing during maximum axial displacement of said tubing; and
   a support clamp coupled to said dielectric support and wear sleeve and to said fuel tank, said support clamp having an inside diameter slightly greater than said sleeve's outside diameter to permit axial displacement of said sleeve but restrain radial displacement of said sleeve.

2. The support assembly according to claim 1, further including an adhesive layer between said first and second support sleeve members for bonding said members together, said adhesive having a dielectric strength sufficiently great to prevent arcing between said tubing and an adjacent member.

3. The support assembly according to claim 1, further including a support bracket coupled to said support assembly and to said fuel tank for retaining said clamp in a fixed position with respect to said fuel tank and sufficiently far from said fuel tank to prevent electrical arcing between said tubing and said fuel tank.

4. The support assembly according to claim 1 wherein said circumferentially mating surface extends longer circumferentially than the radial width of said support sleeve.

5. The support assembly according to claim 4 wherein said dielectric strength of said adhesive is measured circumferentially along the mating surfaces of said projecting portions.

6. The support assembly according to claim 4 wherein at least one of said projecting portions is circumferentially tapered.

7. The support assembly according to claim 4, further including:
   an axial groove in said first wear sleeve member and a mating axial tongue in said second wear sleeve member for locking said first and second members together and having a fixed outside diameter.

8. The support assembly according to claim 4, wherein said circumferential surface is at least twice as long as said radial width.

9. The support assembly according to claim 4, wherein said circumferential surface is at between 1.5 and 2 times longer than the radial width.

10. The support assembly according to claim 1 further including a layer of adhesive between said tubing and said support sleeve.

11. The support assembly according to claim 1 wherein said sleeve's axial length is sufficiently long to prevent arcing between said tubing and said clamp.

12. The support assembly according to claim 1, further including a dielectric coating between said support sleeve and said tubing extending axially along said tubing for a length sufficiently long to prevent arcing between said tubing and said clamp.

13. A method of retaining a metal tubing within a nonmetallic fuel tank, comprising:
   applying adhesive to a first support and wear sleeve member;
   applying adhesive to a second support and wear sleeve member;
   coupling said first support sleeve member to said second support sleeve member along circumferentially extending surfaces to form a single support sleeve, said single support sleeve encircling said tubing and having a precisely determined outside diameter, said single support sleeve having a dielectric strength above a predetermined minimum value for a predetermined axial length sufficient to prevent arcing between said tubing and adjacent structures within said fuel tank; and coupling a support clamp having metal members between said single support sleeve and said fuel tank, said clamp having metal members and having an inside diameter slightly greater than said outside diameter of said single support sleeve to permit axial movement of said single support sleeve with respect to said clamp but to restrain radial movement thereof.

14. The method according to claim 13, further including the step of:
applying adhesive to said tubing prior to coupling said support sleeve members to each other.

15. The method according to claim 13 wherein the dielectric strength of said adhesive exceeds said predetermined minimum value of a dielectric strength.

16. The method according to claim 13, further including the step of coupling an insulator to said tubing prior to coupling said support and wear sleeve members to each other, the axial length of said insulator having a length greater than said predetermined axial length.

* * * * *